US009310118B2

(12) United States Patent
Zavitsanos (10) Patent No.: US 9,310,118 B2
(45) Date of Patent: Apr. 12, 2016

(54) THERMALLY INSULATIVE CONTAINER HAVING MULTIPLE COMPARTMENTS

(71) Applicant: Marcos Zavitsanos, Los Angeles, CA (US)

(72) Inventor: Marcos Zavitsanos, Los Angeles, CA (US)

( * ) Notice: Subject to any disclaimer, the term of this patent is extended or adjusted under 35 U.S.C. 154(b) by 14 days.

(21) Appl. No.: 14/529,685

(22) Filed: Oct. 31, 2014

(65) Prior Publication Data
US 2015/0238033 A1 Aug. 27, 2015

Related U.S. Application Data

(60) Provisional application No. 61/944,777, filed on Feb. 26, 2014.

(51) Int. Cl.
*F25D 3/08* (2006.01)
*A45C 11/20* (2006.01)

(52) U.S. Cl.
CPC .. *F25D 3/08* (2013.01); *A45C 11/20* (2013.01)

(58) Field of Classification Search
CPC .......... A47G 23/04; B65D 1/36; B65D 25/04; B65D 43/14; B65D 47/32; B65D 81/3813; B65D 2543/00953; B65D 51/28; F25D 3/08
USPC .......... 220/254.6, 254.1, 254.3, 256.1, 259.1, 220/915.2, 915.1, 592.01, 592.02, 592.03, 220/592.09, 592.12, 592.15, 592.16, 220/592.18, 592.19, 231, 367.1, 521, 522, 220/503, 505; 62/249, 440, 441, 442, 459
See application file for complete search history.

(56) References Cited

U.S. PATENT DOCUMENTS

| 2,496,296 | A | 2/1950 | Lobl |
| 5,562,331 | A | 10/1996 | Spykerman et al. |
| 6,276,162 | B1 | 8/2001 | Schemel |
| 6,328,179 | B1 | 12/2001 | Conrado et al. |
| 6,474,097 | B2 | 11/2002 | Treppedi et al. |
| 7,306,243 | B2 | 12/2007 | Van Horn et al. |
| 2004/0178208 | A1 | 9/2004 | Leba et al. |
| 2004/0262319 | A1* | 12/2004 | Fisher ....................... F25D 3/08 220/592.03 |
| 2005/0127081 | A1 | 6/2005 | Leba et al. |
| 2005/0263528 | A1 | 12/2005 | Maldonado et al. |
| 2008/0128428 | A1* | 6/2008 | Beckerman ............ B65D 25/06 220/532 |
| 2011/0203297 | A1* | 8/2011 | Oberweis .................. F25D 3/14 62/56 |
| 2013/0082051 | A1* | 4/2013 | Kaufmann ............. A47G 21/14 220/23.83 |

OTHER PUBLICATIONS

Ryan Grepper, The Coolest Cooler downloaded from <https://www.kickstarter.com/projects/ryangrepper/coolest-cooler-21st-century-cooler-thats-actually>. Posting dated Jul. 8, 2014.

* cited by examiner

*Primary Examiner* — Robert J Hicks
*Assistant Examiner* — Kareen Thomas
(74) *Attorney, Agent, or Firm* — William K. Nelson (57) ABSTRACT

The present invention provides improved thermally insulative containers (e.g., ice chests, coolers, lunch boxes, etc.) that include one or more isolation compartment(s) that may be isolated from a storage compartment holding ice or other cooling agent(s). The isolation compartment may be used to store items that are to be kept dry and at a higher temperature than food, beverages, and other items that are typically kept in the storage compartment. In some examples, the one or more isolation compartment(s) may include thermal vents between the compartments for varying the temperature between the one or more isolation compartment(s) and the storage compartment.

20 Claims, 10 Drawing Sheets

THERMALLY INSULATIVE CONTAINER HAVING MULTIPLE COMPARTMENTS

FIELD OF THE INVENTION

The present invention relates to thermally insulated containers and more particularly to improved thermally insulative containers that may include one or more thermally isolated compartments from each other.

DISCUSSION OF THE BACKGROUND

Existing portable coolers typically include rectangular body having a pivoting lid, a drain for removing water, handles for carrying the cooler, and a single compartment into which everything is intermingled, including ice or some other cooling agent along with beverages, foodstuffs, dishes, and any other items that should not be left out in the sun (e.g., sunscreen, medications, etc.). The lack of organizing structures in the cooler and the movement of the cooler from location to location results in the shifting and muddling of the items stored in the cooler, causing a jumbled mess of the items. Also, all of the items in the cooler may be soaked if they are left in the cooler for a substantial period of time without draining the water in the cooler as the ice melts. Thus, conventional coolers have significant drawbacks in terms of proper organization and storage of various categories of items. In general, conventional coolers are well-designed for single serving beverages and foods, but are poorly designed for foods and beverages that are stored in reclosable containers, foods and beverages that are stored in non-closable containers, and personal items that should be kept cool and/or out of the sun (e.g., chapstick, sunscreen, medications, personal electronics, etc.).

It is therefore desirable to provide thermally insulative containers that are better capable of organizing, storing, and separating beverages, foodstuffs, and other items within the container.

SUMMARY OF THE INVENTION

The present invention provides improved thermally insulative containers and more particularly to improved thermally insulative containers (e.g., ice chests, coolers, lunch boxes, etc.) that include one or more isolation compartment(s) that may be isolated from a coolant compartment holding ice or other cooling mechanism. In some embodiments, the one or more isolation compartment(s) may include thermal vents between the compartments for varying the temperature between the one or more isolation compartment(s) and the coolant compartment. In further embodiments, the insulative container may include thermal diffusion barriers over the thermal vents, which may prevent direct air flow between the coolant compartment and the one or more isolation compartment(s) and may slow the thermal exchange between the coolant compartment and the one or more isolation compartment(s).

This invention relates to improvements in thermally insulative containers and more particularly to portable containers suitable for holding and preserving in a cooled condition solid and liquid food stuffs, beverages, and other kind of items that should not be left out in the sun or weather (e.g., cell phones, make up, sunscreen, pharmaceuticals, etc.). The containers of the present invention may include at least two compartments for holding various foodstuffs, beverages, personal items, etc. The at least two compartments may be sealed off from each other by a thermally insulative door, which may create two different temperature zones within the container.

The containers of the present invention may have at least one coolant compartment in which ice, dry ice, cooler packs, or other materials or devices for absorbing heat and cooling surrounding materials. Without limiting the invention, the coolant compartment may be the largest compartment in the cooler (e.g., the basin or tub of the container). The containers of the present invention may also include one or more isolation compartment(s) that is separated from the coolant compartment by an insulative structure (e.g., an insulative door that closes of the one or more isolation compartment(s) from the coolant compartment).

The coolant compartment may be a relatively large compartment, allowing it to store several pounds of ice or other cooling materials such that food, beverages, and other items may be kept at a lower temperature than ambient air temperature. The one or more isolation compartment(s) may allow for the storage of additional delicate, temperature-sensitive, electronic, or items that the user wants to keep cool and dry within the container without exposing the items to water or other unwanted materials. Without limiting the invention, the one or more isolation compartment(s) may be smaller than the cooling compartment. The dry compartment may be formed within a lid of the container, which may form the upper wall or ceiling of the container. Positioning the one or more isolation compartment(s) in the lid provides separation from the ice and other materials within the coolant compartment. Positioning the isolation compartment in the lid also allows for the utilization of space around the underside of the lid that constitutes typically unused or "dead" space in conventional coolers.

The lid of the container may be an insulative structure that prevents or limits the heat from penetrating the compartments of the container when the lid is in a closed position. The door of the isolation compartment(s) may seal tightly against the underside of the lid. The door of the isolation compartment(s) may also be made from an insulative material and/or an insulative construction to prevent or limit the movement of heat from the isolation compartment(s) into coolant compartment. For example, and without limitation, the door of the isolation compartment(s) may have a blow-molded, two-layer sealed polymer construction, optionally containing an insulative foam material therein. The isolation compartment(s) and the access door thereto may be positioned on the underside of the lid such that the door of the isolation compartment(s) is exposed to the cooled and insulated interior of the coolant compartment. Other arrangements and structures of the isolation compartment(s) are contemplated within the scope of the present invention. For example, the insulative container may include multiple isolation compartments in the underside of the lid that individually open and close against the bottom side of the lid (e.g., each compartment have its own door that latches against underside of the lid).

The door(s) of the isolation compartment(s) may also be structured such that it can be tightly sealed against the underside of the container lid. For example, the lid and the container may each be molded pieces having complementary closing surfaces that allow the door to seal flushly against the corresponding surface of the lid (e.g., the lid may have a recess that runs near the perimeter that is complementary to an outer edge of the door of the isolation compartment(s)). The lid and/or door may also have features that aid in insulating and sealing the dry isolation compartment from the coolant compartment, such as a rubber or foam gasket in the bottom side of the lid against which the door may flushly close and lock into position. The insulated, sealed condition of the isolation compartment(s) may allow the temperature within the isolation compartment(s) to be higher than the temperature in the coolant compartment, while still being lower than the ambient air temperature. The isolation compartment(s) may be used to store items that need to be kept cool, out of the sun, and/or dry, and may not be properly or preferably stored intermingled with ice and/or foodstuffs.

The door(s) of the isolation compartment(s) may include one or more thermal vents therein for varying and controlling the rate of thermal energy exchange between the storage compartment and the isolation compartment. For example, there may be one or more sliding or rotating vent doors embedded within the door(s) of the isolation compartment(s) that can be opened to varying degrees to allow the flow of air between the storage compartment(s) and the isolation compartment, thereby allowing the isolation compartment(s) to be kept at a lower temperature in comparison to when the vent door(s) are closed. In some implementations, and without limitation, the thermal vent(s) may be a linear slot having a sliding vent door therein that can be operated with a handle attached to the door. The user may open the vent to open a desired portion of the vent. In other implementations, and without limitation, the thermal vent(s) may have various other shapes, such as a partial circle (e.g., a semi-circular vent) having a rotating vent door that rotates through the partial circular vent.

The vent(s) in the door(s) of the isolation compartment(s) may have additional features to (1) prevent the movement of water and/or other liquids between the isolation compartment(s) and the coolant compartment, and/or (2) regulate the movement of thermal energy between the isolation compartment(s) and the coolant compartment of the container when the vent(s) are open. In some embodiments, and without limitation, the container may include an membrane or barrier over the vents that may act as a moisture barrier and/or an insulator to limit or slow the movement thermal energy across the vent(s).

It is to be understood that there may be additional variations in the design of the container described herein. For example, and without limitation, the container may be of various sizes. The container may come in small, moderate, and large sizes. The container may be have a lunch box size (e.g., an interior size of about 1 to about 2 cubic feet), a medium ice chest size (e.g., an interior size of about 2 to about 4 cubic feet), or a large chest size (e.g., an interior size of about 4 cubic feet to about 7 cubic feet). In further examples, and without limitation, the container may have various shapes such as a cubic, rectangular prism, cylindrical, spheroid, partial spheroid, etc. The container may include wheels and a tote handle for ease of transport. There may be one or more dividers in the storage compartment of the container. Other useful features may be included in the container as well.

In some embodiments, and without limitation, the present invention relates to a thermally insulated container that includes a body having thermally insulative walls and a first compartment therein for storing food and beverages; a lid attached to the body, the lid having a perimeter shape that is complementary to an opening in the body and the lid seals the compartment when the lid is closed over the compartment; a second compartment within the lid accessible from an underside of the lid, the second compartment including a door for accessing the second compartment attached to the lid, wherein the door has a surface at or near its edge that seals against a corresponding complementary surface in the underside of the lid to close the compartment; and at least one adjustable thermal vent in a surface of the second compartment for allowing the passage of heat between the first and second compartments. In some implementations, and without limitation, the second compartment may also include a closing mechanism for closing the adjustable thermal vent, such as a sliding or rotating door. In some implementations, and without limitation, the at least one adjustable thermal vent may have a barrier thereover (e.g., such as a membrane, fabric, or solid barrier) preventing the passage of fluid between the first compartment and the second compartment.

In further implementations, and without limitation, the barrier may also be hydrophobic (e.g., a fabric made from hydrophobic fibers or a fabric having a hydrophobic coating). The barrier membrane may also function to slow the movement of thermal energy from the second compartment to the first compartment, thereby maintaining a higher temperature in the second compartment for an extended period of time while still cooling the second compartment. In some implementations, and without limitation, the barrier may be coated with an insulative composition for slowing thermal transfer between the first and second compartments. For example, the thermal barrier may be coated with insulative ceramic material, such as particle or hollow microspheres that may be made from vermiculite, perlite, sepiolite, diatomaceous earth, bentonite, cenospheres, antimony tin oxide, indium tin oxide, titanium dioxide, silicon carbide, chrome oxide, cobalt oxide, nickel oxide, high silica glass, combinations thereof, and/or other ceramic materials. In some implementations, the barrier may include a foam, rubber, gel, or other solid or semi-solid insulative material to slow the movement of thermal energy between the first and second compartments.

In some implementations, and without limitation, an interior wall of the second compartment may include multiple recesses therein for holding stored items. For example, the door may include several separate recesses or divided areas that can be used to separate items stored in the second compartment. In further implementations, the recesses may include fastening devices therein for holding stored items in a static position. For example, the recesses may include cinching straps, elastic bands, clips, clamps, nets, pockets, and other fastening devices for holding items such as mobile electronic devices (e.g., phones, tablets, etc.), medication containers, chapsticks, watches, eyeglasses, etc. in a static position so that they do not shift when the lid of the container is lifted.

In some implementations, and without limitation, the door comprises multiple divided compartments therein that are thermally insulated from one another when the door is closed against the lid. In some implementations, and without limitation, the multiple divided compartments individually include at least one adjustable thermal vent.

In some embodiments, and without limitation, the present invention relates to a thermally insulated container that includes a body having thermally insulative walls and a first compartment therein, the body having an opening therein for access to the interior of the first compartment; a tray having a perimeter shape that is substantially the same as the opening in the body, the tray being attached to the body and moveable with respect to the opening; a thermally insulated lid having a perimeter shape that is substantially the same as the opening in the body, wherein the lid closes over the tray and the opening in the body, and thermally seals the insulated container thereby closing the first compartment between the tray and the body and creating a second compartment between the lid and the tray. In some implementations, and without limitation, the tray may include a plurality of compartments therein for separating stored items. In some implementations, and without limitation, at least one of the plurality of compartments is individually thermally insulated from the other compartments when the lid is closed over the tray. In some implementations, and without limitation, the container may include at least one moveable divider that can be repositioned within the tray, and the tray includes a plurality of positioning structures for engaging with the at least one divider and holding it in place. In some implementations, and without limitation, the container may include at least one adjustable thermal vent in a surface of the tray for allowing the passage of heat between the first and second compartments. In some implementations, and without limitation, the tray may further include a closing mechanism for closing the adjustable thermal vent. In some implementations, and without limitation, the tray includes fastening devices thereon for holding stored items in a static position. In some implementations, and without limitation, the container may further include an insulative gasket in along an interfacing surface of the lid that is between the lid and the tray and creates a thermal seal between the lid and the tray when the lid is closed over the tray.

In some embodiments, and without limitation, the present invention relates to an insulative container capable of storing food and other items at different temperatures, which includes a body having thermally insulative walls and a storage compartment therein, the body having an opening therein for access to the interior of the first compartment; a lid that closes over the opening and having a perimeter shape that is complementary to the shape of the opening; a tray having thermally insulative walls that sits over the first compartment and has at least one recess therein for storing items, the tray having a sealing edge that closes against a bottom side of the lid, wherein the lid has an interfacing surface against which the sealing edge of the tray can be closed, thereby thermally sealing the at least one recess against the lid; at least one adjustable thermal vent in a surface of the tray between the first compartment and the tray for allowing the passage of heat between the storage compartment and the recess; and a closing mechanism for partially or fully closing the adjustable thermal vent. In some implementations, and without limitation, the container may further include fastening devices on the tray and in the bottom side of the lid for holding stored items in a static position within the thermally sealed space between the tray and the bottom side of the lid. In some implementations, and without limitation, the container may further include at least one moveable divider that can be repositioned within the at least one recess, where the tray includes a plurality of positioning structures within the at least one recess for engaging with the at least one divider and holding it in place. In some implementations, and without limitation, the tray includes a plurality of recesses therein for separating stored items. In some implementations, and without limitation, at least one of the plurality of recesses is individually thermally insulated from the other recesses when the tray is closed a bottom side of the lid.

It is an object of the present invention to provide a thermally insulative container (e.g., a cooler, an ice chest, etc.) that can store items in separate compartments which may be thermally insulated from one another.

It is also an object of the present invention to provide a thermally insulative container (e.g., a cooler, an ice chest, etc.) having a cooling compartment that may hold ice, water, or other solid or fluid coolants therein and a second compartment that provides a fluid barrier that prevents or reduces the passage of fluid or moisture from the cooling compartment to the second compartment.

It is also an object of the present invention to provide a thermally insulative container (e.g., a cooler, an ice chest, etc.) having an isolation compartment that is separate from the larger storage compartment that includes multiple separate cells therein for storing various items.

It is also an object of the present invention to provide a thermally insulative container (e.g., a cooler, an ice chest, etc.) having an isolation compartment that is separate from the larger storage compartment that includes multiple dividers, the position of which can be adjusted and moved to create slots or spaces of different sizes within the isolation compartment for variously sized items.

It is also an object of the present invention to provide a thermally insulative container (e.g., a cooler, an ice chest, etc.) having an isolation compartment that is separate from the larger storage compartment that includes multiple fastening devices (e.g., cinching straps, elastic bands, clips, clamps, nets, pockets, and other fastening devices) for holding items such as mobile electronic devices (e.g., phones, tablets, etc.), medication containers, chapsticks, watches, eyeglasses, flashlights, etc. in a static position so that they do not shift when the lid of the container is lifted.

It is an object of the present invention to provide a thermally insulative container (e.g., a cooler, an ice chest, etc.) that can store items in separate compartments which may be thermally insulated from one another, and includes one or more thermal vents between the isolated compartments, where the thermal vents may have a door that can close and adjust the size of the vent.

Additional aspects and objects of the invention will be apparent from the detailed descriptions and the claims herein.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1-10, it is seen that the present invention includes various embodiments of thermally insulative container having at least two compartments that may be thermally insulative from one another.

Figure 1:
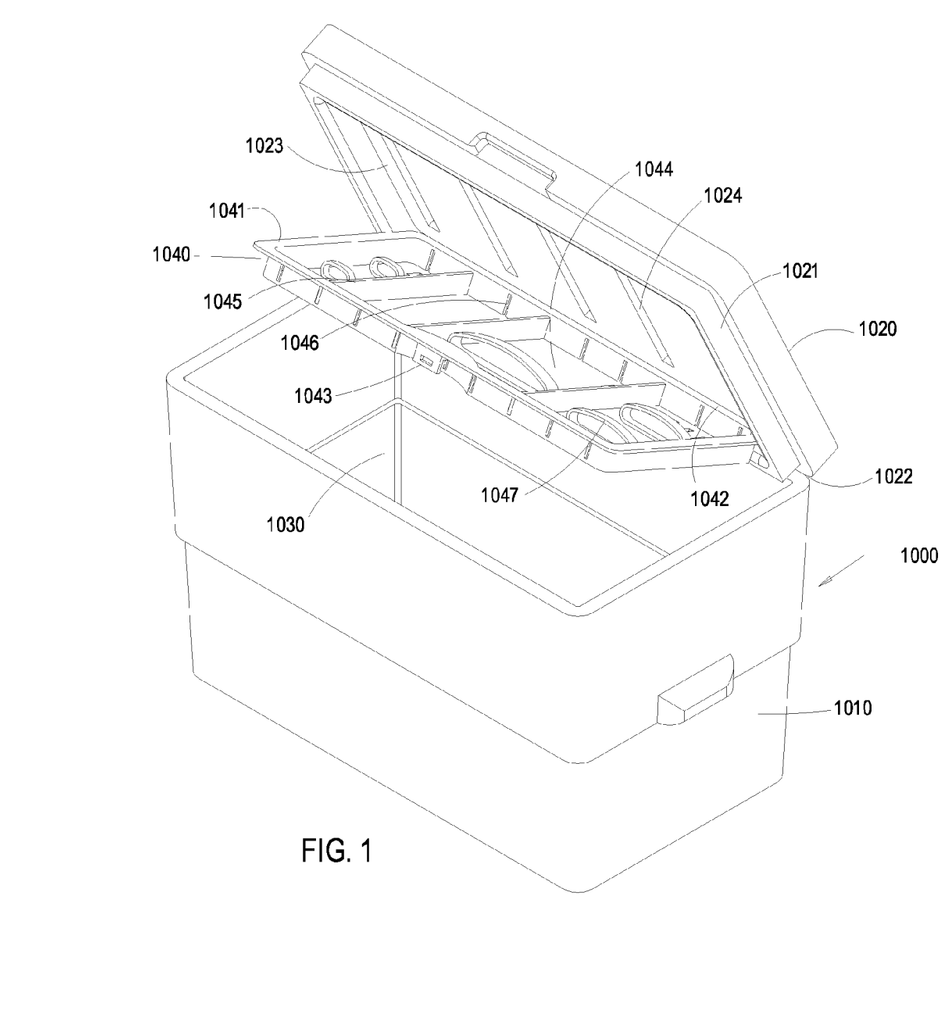
FIG. 1 is a perspective view of a thermally insulative container according to an embodiment of the present invention, in which the lid of the container is open and the door of the isolation compartment is open.
Figure 2:
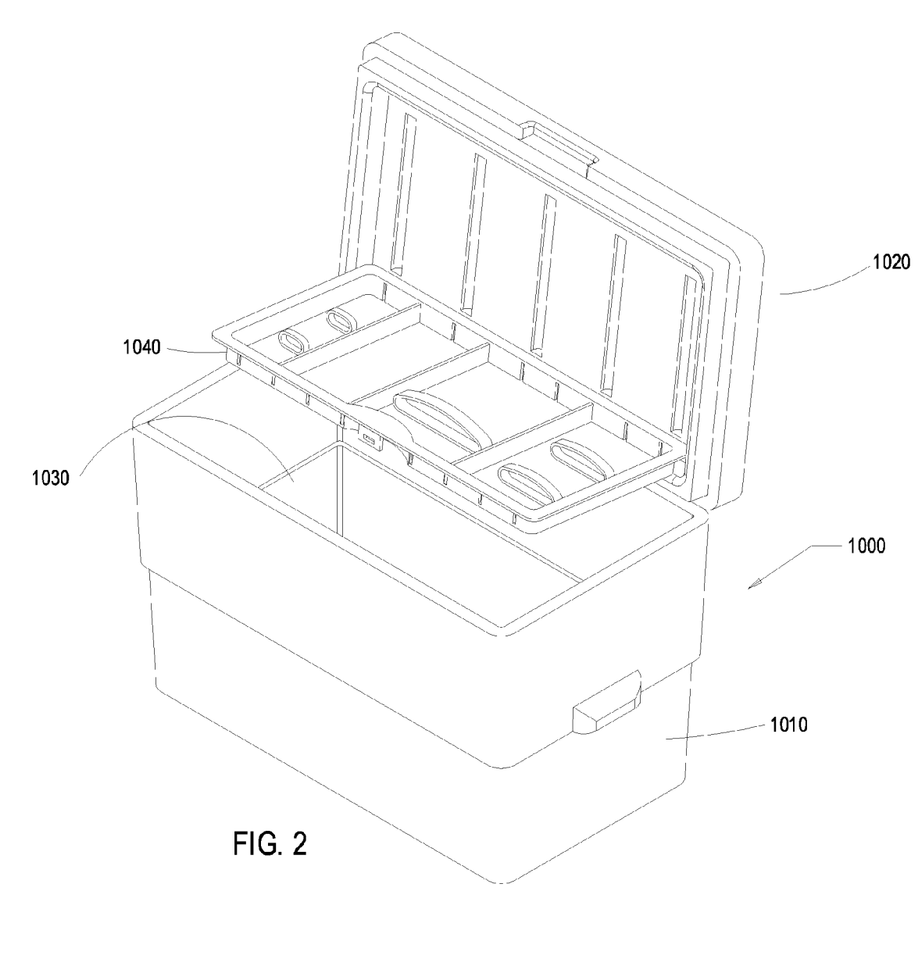
FIG. 2 is a perspective view of a thermally insulative container according to an embodiment of the present invention, in which the lid of the container is open and the door of the isolation compartment is open and at a 90° relative to the lid.

Without limiting the invention, FIGS. 1-2 show an exemplary embodiment of a thermally insulative container according to the present invention. Container 1000 includes body 1010, a lid 1020, and an isolation compartment door 1040. The body 1010 contains a large coolant and storage compartment 1030 which may be used to store a coolant (e.g., cold-packs, ice, dry ice, ice water, etc.), objects and materials that are to be kept cool (e.g., food, beverages, fish, organs and other tissues for medical transport, etc.), and various other items. The lid 1020 may be hingedly attached to the body 1010 at hinged attachment 1022, such that it is able swing open at least 80°. The lid 1020 may have a sealing lip 1021 that nests within inner wall of the body 1010, creating a tight sealed connection between the lid 1020 and the body 1010 (e.g., an air-tight seal for minimizing the transfer of thermal energy between the exterior and interior of the container 1000).

The isolation compartment door 1040 may be hingedly attached to the underside of the lid 1020 at hinged attachment 1042, although it is to be understood that the position and attachment of the isolation compartment door may vary in other embodiments. The isolation compartment door 1040 may have an insulative structure. For example, and without limitation, the door 1040 may be made of a two-layer molded plastic having a cavity therein to act as a barrier to the transfer of thermal energy. In some implementations, and without limitation, the cavity within the door 1040 may be filled with an insulative material (e.g., an insulative foam or rubber). In other implementations, the cavity within the door 1040 may contain a partial vacuum to improve its thermal insulation. In further implementations, and without limitation, one or more surfaces of the door 1040 (e.g., the upper surfaces and/or the bottom surface of the door) may be coated with thermally reflective material (e.g., aluminum film, etc.). In still further implementations, and without limitation, the door 1040 may be made from other materials, such as reflective metals (e.g., aluminum, stainless steel, etc.), solid insulative polymer materials, fiberglass, composite materials, etc.

The isolation compartment door 1040 may have a perimeter rim 1041 that interfaces with a sealing channel 1023 on the bottom side of the lid 1020. The perimeter rim 1041 may have a coating or gasket thereon for creating a tight, insulative seal when the door 1040 is closed against the bottom side of the lid 1020. The coating or gasket may be a soft insulative material (e.g., a rubber, rubber foam, etc.) that can be compressed to prevent the passage of air or fluids when the door 1040 is closed against the lid 1020. In other implementations, and without limitation, the lid 1020 may include a coating or gasket within the sealing channel 1023, and the perimeter rim 1041 may close against the coating or gasket.

When the isolation compartment door 1040 is closed against the underside of the lid 1020, a thermally sealed isolation compartment may be established between the door 1040 and the underside of the lid 1020. The isolation compartment door 1040 may include a securing member 1043 (e.g., a latch) that engages with the underside of the lid 1020 and holds the door 1040 closed and sealed against the underside of the lid 1020 when the door 1040 is moved into the closed position. The securing member 1043 may allow the door 1040 to maintain a thermally insulative seal until a user of the container operates the securing member 1043 to release the door 1040 from the lid 1020. In some implementations, and without limitation, the container 1000 may also include a locking mechanism (not shown) which may be located near or mechanically integrated into the securing mechanism. The locking mechanism may be a keyed lock, a combination lock, or other locking mechanism that prevents an unauthorized person from accessing the isolation compartment. The locking mechanism may prevent the theft or tampering of valuable, delicate, or personal items that are stored in the isolation compartment. The foregoing description the locking mechanism may be including in other embodiments discussed herein.

The isolation compartment door 1040 may have an upper tray-like side with a recess 1044 therein for storing items. Within the recess 1044, the door 1040 may include one or more dividers 1045 and slots 1046. The dividers 1045 may be used to isolation stored items within the recess 1044, and may be repositionable to allow the storage area of recess 1044 to be customized to the particular items that the user wishes to store. The dividers 1045 may be positioned within the various slots 1046 available in the recess 1044. For example, and without limitation, a relatively narrow slot may be created to store small items such as playing cards, mobile phones, etc.

The isolation compartment door may also include multiple fastening devices 1047 (e.g., cinching straps, elastic bands, nets, pockets, etc.) for holding items such as mobile electronic devices (e.g., phones, tablets, etc.), medication containers, chapsticks, watches, eyeglasses, flashlights, etc. in a static position so that they do not shift when the lid of the container is lifted or the container 1000 is moved. The fastening devices 1047 may be cinchable, in order to tightly secure objects of various sizes. It is to be understood that the present invention is not limited to the straps and bands shown in the figures, and that the isolation compartment may include various other kinds of fastening devices such as clips, clamps, etc. Fastening devices may also be included on the underside of the lid 1020. For example, and without limitation, the underside of the lid 1020 may include recessed slots 1024 that are sized to receive specific items (e.g., chapstick, flashlights, etc.).

Without limiting the invention, FIG. 2 shows the isolation compartment door 1040 may be hingedly attached to the lid 1020 such that the door 1040 opens to about 90° (e.g., horizontal) when the lid 1020 is opened to 90°. The container 1000 may include mechanical stops (not shown) that prevent the lid 1020 and/or the door 1040 from over-rotating. Additionally, the container 1000 may have a mechanical stopper to hold the lid 1020 open at about 90° when the lid is rotated to the about 90° open position (e.g., a bumper and/or a pressure fitting securing tab or bar that engages the lid when it is rotated to the fully open position). It is to be understood that the present invention is not limited to the example of FIG. 2, and that the lid of the container may be opened to a range of angles relative to its closed position (e.g., in the range of about 80° to about 120°, or any value or range of values therein). It is to be further understood that in various implementations in which the lid has various opening angles, the isolation compartment door may be configured to open to an angle relative to the opening angle of the lid such that the isolation compartment door will be substantially horizontal when fully open. The foregoing description opening angles of the lid and the isolation compartment door, as well as the relationship of the opening angles thereof applies to each of the embodiments discussed herein.

Figure 3:
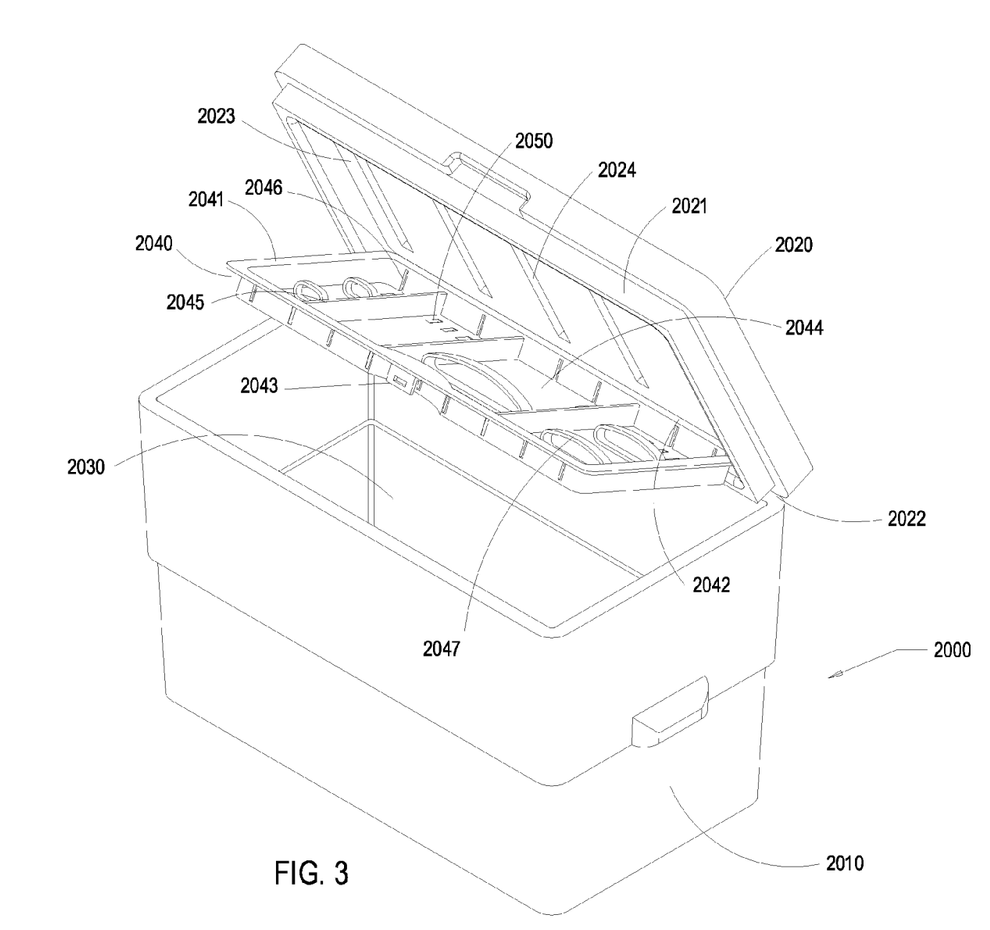
FIG. 3 is a perspective view of a thermally insulative container according to an embodiment of the present invention, in which the lid of the container is open and the door of the isolation compartment is open.
Figure 4:
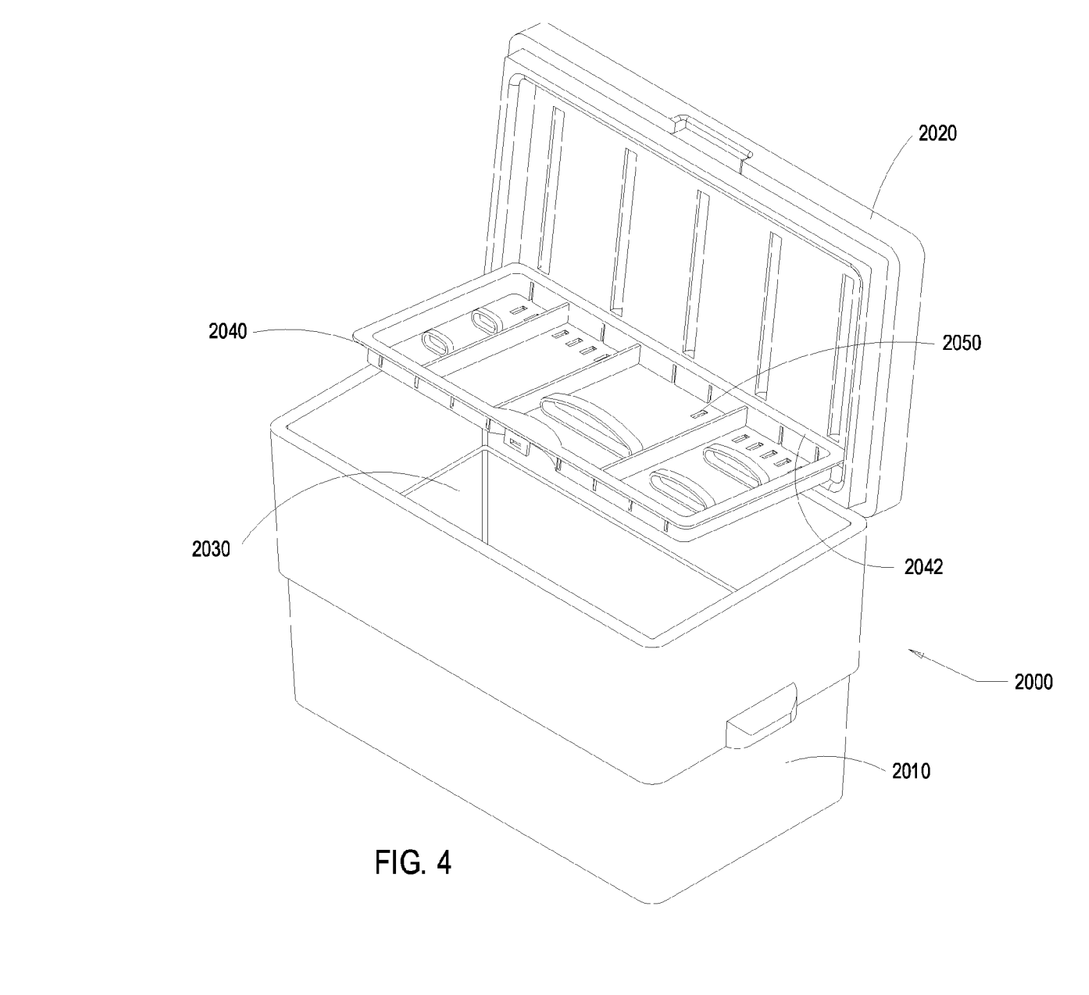
FIG. 4 is a perspective view of a thermally insulative container according to an embodiment of the present invention, in which the lid of the container is open and the door of the isolation compartment is open and at a 90° relative to the lid.
Figure 5:
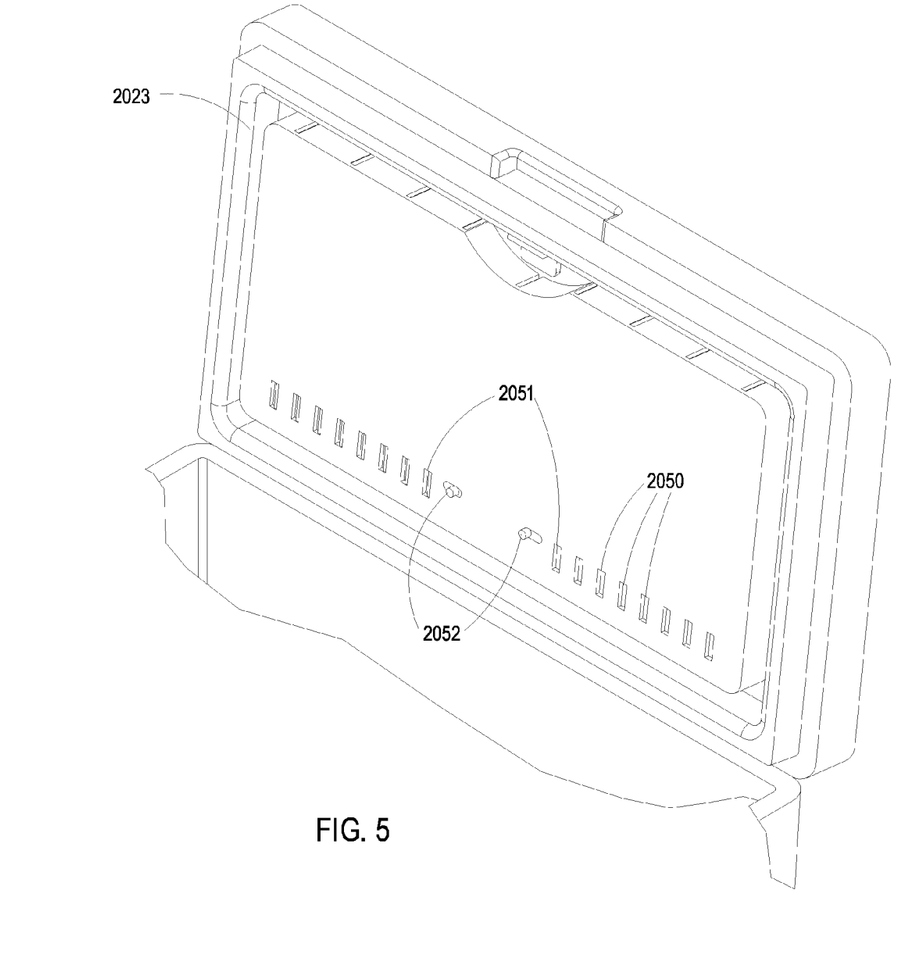
FIG. 5 is a close-up perspective view of the lid and door of the isolation compartment of a thermally insulative container according to an embodiment of the present invention, in which the lid of the container is open and the door of the isolation compartment is closed against the lid.

Without limiting the invention, FIGS. 3-5 show an exemplary embodiment of a thermally insulative container 2000 that shares several similar features with the embodiment shown in FIGS. 1-2, and the reference numbers in FIGS. 3-5 are similar to those of FIGS. 1-2. The embodiment of FIGS. 3-5 includes additional features, specifically thermal vents and associated structures.

The container 2000 shown in FIGS. 3-5 includes a body 2010, a lid 2020, and an isolation compartment door 2040. The body 2010 contains a large storage compartment 2030 which may be used to store a coolant and objects and materials that are to be kept cool. The lid 2020 may be hingedly attached to the body 2010 at hinged attachment 2022, such that it is able swing open at least 80° (e.g., in a range of about 80° to about 120°, or any value or range of values therein as discussed above). The lid 2020 may have a sealing lip 2021 that nests within inner wall of the body 2010, creating a tight sealed connection between the lid 2020 and the body 2010 (e.g., an air-tight seal for minimizing the transfer of thermal energy between the exterior and interior of the container 2000).

The isolation compartment door 2040 may be hingedly attached to the underside of the lid 2020 at hinged attachment 2042, although it is to be understood that the position and attachment of the isolation compartment door may vary in other embodiments. The isolation compartment door 2040 may have an insulative structure. The isolation compartment door 2040 may have a perimeter rim 2041 that interfaces with a sealing channel 2023 on the bottom side of the lid 2020. The perimeter rim 2041 may have a coating or gasket thereon for creating a tight, insulative seal when the door 2040 is closed against the bottom side of the lid 2020. In other implementations, and without limitation, the lid 2020 may include a coating or gasket within the sealing channel 2023, and the perimeter rim 2041 may close against the coating or gasket.

When the isolation compartment door 2040 is closed against the underside of the lid 2020, a thermally sealed isolation compartment may be established between the door 2040 and the underside of the lid 2020. The isolation compartment door 2040 may include a securing member 2043 (e.g., a latch) that engages with the underside of the lid 2020 and holds the door 2040 closed and sealed against the underside of the lid 2020 when the door 2040 is moved into the closed position. In some implementations, and without limitation, the container 2000 may also include a locking mechanism (not shown) which may be located near or mechanically integrated into the securing mechanism. The locking mechanism may be a keyed lock, a combination lock, or other locking mechanism that prevents an unauthorized person from accessing the isolation compartment. The locking mechanism may prevent the theft or tampering of valuable, delicate, or personal items that are stored in the isolation compartment.

The isolation compartment door 2040 may have an upper tray-like side with a recess 2044 therein for storing items. Within the recess 2044, the door 2040 may include one or more dividers 2045 and slots 2046. The dividers 2045 may be repositionable within the various slots 2046 available in the recess 2044.

The isolation compartment door 2040 may also include multiple fastening devices 2047 (e.g., cinching straps, elastic bands, nets, pockets, etc.) for holding items such as mobile electronic devices (e.g., phones, tablets, etc.), medication containers, chapsticks, watches, eyeglasses, flashlights, etc. in a static position so that they do not shift when the lid of the container is lifted or the container 2000 is moved. Fastening devices may also be included on the underside of the lid 2020 (e.g., recessed slots 2024 shaped for various items such as chapstick, flashlights, etc.).

Additionally, the isolation compartment 2040 may include multiple thermal vents 2050 that traverse the entire thickness of the floor of the door 2040. As shown in FIG. 5, the vents may be closed and opened by sliding doors 2051, which can be controlled and positioned by handles 2052. The user can open, partially open, or close the thermal vents 2050 by sliding the sliding doors 2051 left and right using the handles 2052. Closing the sliding doors may prevent the fluid, moisture, or air from moving between the large compartment 2030 and the isolation compartment, preventing items stored in the isolation compartment from getting wet and substantially preventing the transfer of thermal energy between the large compartment and the isolation compartment. Opening or partially opening the sliding doors allows the exchange of thermal energy between the compartments and may result in a greater temperature drop in the isolation compartment.

Figure 6:
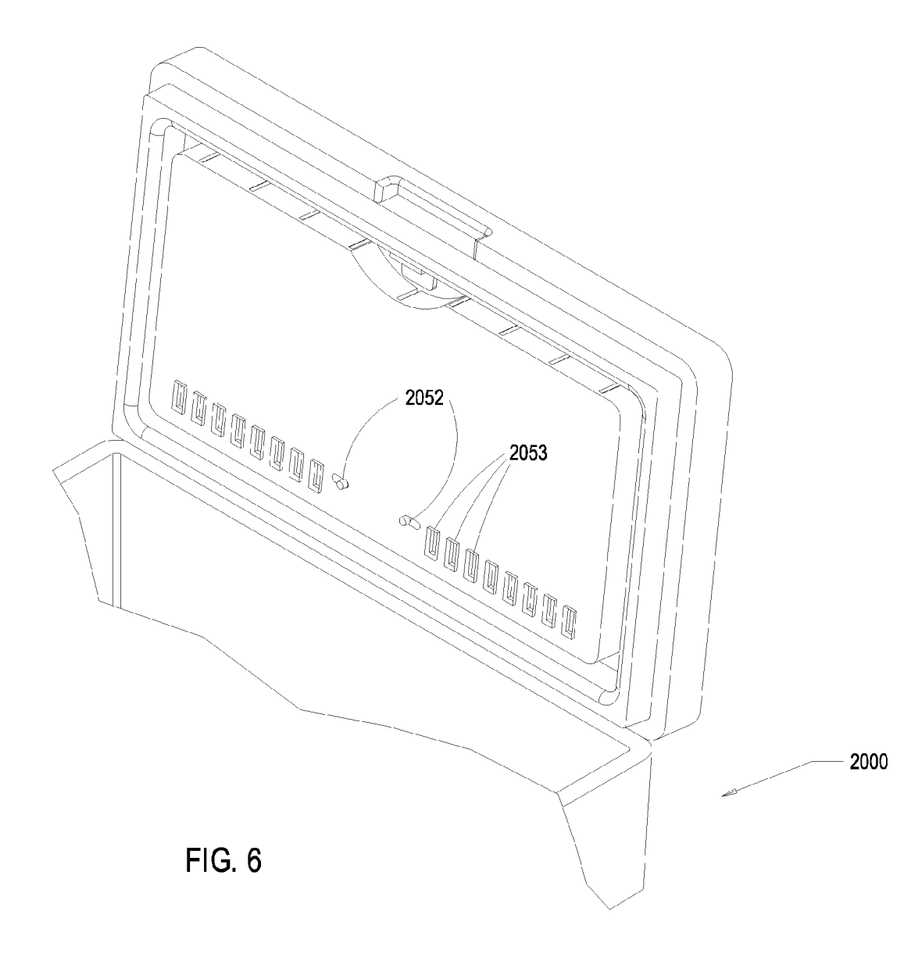
FIG. 6 is a close-up perspective view of the lid and door of the isolation compartment of a thermally insulative container according to an embodiment of the present invention, in which the lid of the container is open and the door of the isolation compartment is closed against the lid.

In other implementations, and without limitation, the thermal vents 2050 may further include thermal and/or moisture barriers thereover. Without limiting the invention, FIG. 6 shows the container 2000 including barriers 2053 positioned over the thermal vents 2050. The barriers 2053 may be a thin fabrics, membranes, or films that act as a moisture barrier and/or a thermal damper to slow the exchange of thermal energy between the large compartment 2030 and the isolation compartment. The barrier may be hydrophobic, such as a fabric made from hydrophobic fibers or a fabric having a hydrophobic coating. The barrier membrane may also function to dampen the movement of thermal energy from the isolation compartment to maintain a higher temperature in the isolation compartment for an extended period of time. For example, and without limitation, the barrier may be coated with an insulative composition such as a thermally reflective ceramic, metal, or composite material. In other examples, and without limitation, the barriers 2053 may include an insulative rubber, gel, or foam (e.g., a fabric with a thin insulative foam or rubber layer incorporated therein).

Figure 7:
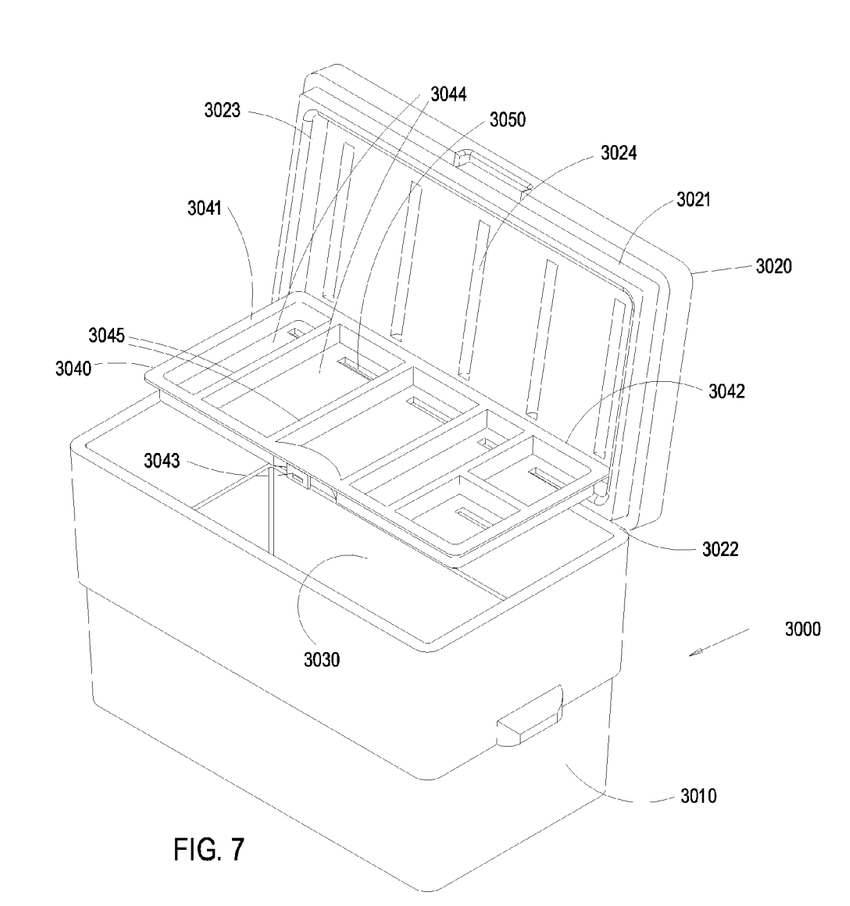
FIG. 7 is a perspective view of a thermally insulative container according to an embodiment of the present invention, in which the lid of the container is open and the door of the isolation compartment is open and at a 90° relative to the lid.
Figure 8:
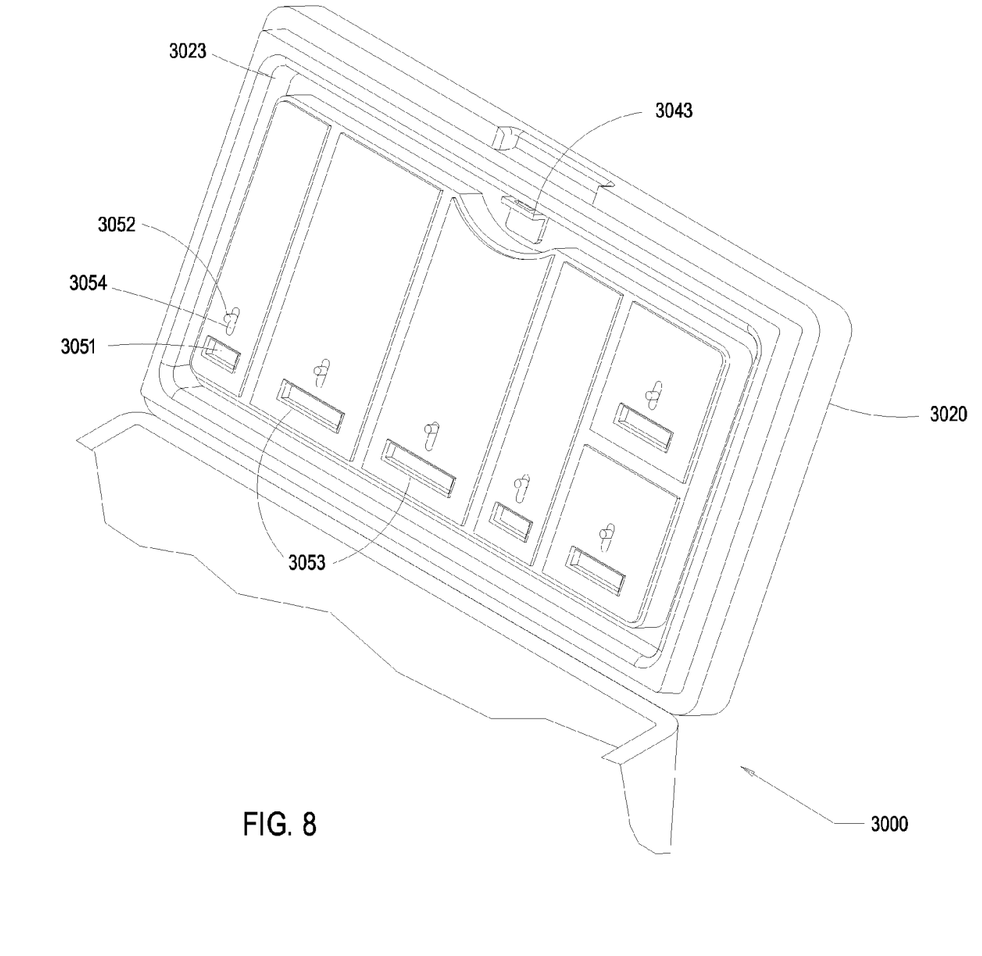
FIG. 8 is a close-up perspective view of the lid and door of the isolation compartment of a thermally insulative container according to an embodiment of the present invention, in which the lid of the container is open and the door of the isolation compartment is closed against the lid.

Without limiting the invention, FIGS. 7-8 show an exemplary embodiment of a thermally insulative container 3000 that shares several similar features with the embodiment shown in FIGS. 1-6, and the reference numbers in FIGS. 7-8 are similar to those of FIGS. 1-6. The exemplary embodiment of FIGS. 7-8 includes varying features, specifically separate cells within the isolation compartment.

The container 3000 shown in FIGS. 7-8 includes a body 3010, a lid 3020, and an isolation compartment door 3040. The body 3010 contains a large storage compartment 3030 which may be used to store a coolant and objects and materials that are to be kept cool. The lid 3020 may be hingedly attached to the body 3010 at hinged attachment 3022, such that it is able swing open at least 80° (e.g., in a range of about 80° to about 120°, or any value or range of values therein as discussed above). The lid 3020 may have a sealing lip 3021 that nests within inner wall of the body 3010, creating a tight sealed connection between the lid 3020 and the body 3010 (e.g., an air-tight seal for minimizing the transfer of thermal energy between the exterior and interior of the container 3000).

The isolation compartment door 3040 may be hingedly attached to the underside of the lid 3020 at hinged attachment 3042, although it is to be understood that the position and attachment of the isolation compartment door may vary in other embodiments. The isolation compartment door 3040 may have an insulative structure. The isolation compartment door 3040 may have a perimeter rim 3041 that interfaces with a sealing channel 3023 on the bottom side of the lid 3020. The perimeter rim 3041 may have a coating or gasket thereon for creating a tight, insulative seal when the door 3040 is closed against the bottom side of the lid 3020. In other implementations, and without limitation, the lid 3020 may include a coating or gasket within the sealing channel 3023, and the perimeter rim 3041 may close against the coating or gasket.

When the isolation compartment door 3040 is closed against the underside of the lid 3020, a thermally sealed isolation compartment may be established between the door 3040 and the underside of the lid 3020. The isolation compartment door 3040 may include a securing member 3043 (e.g., a latch) that engages with the underside of the lid 3020 and holds the door 3040 closed and sealed against the underside of the lid 3020 when the door 3040 is moved into the closed position. In some implementations, and without limitation, the container 3000 may also include a locking mechanism (not shown) which may be located near or mechanically integrated into the securing mechanism. The locking mechanism may be a keyed lock, a combination lock, or other locking mechanism that prevents an unauthorized person from accessing the isolation compartment. The locking mechanism may prevent the theft or tampering of valuable, delicate, or personal items that are stored in the isolation compartment.

The isolation compartment door 3040 may have an upper tray-like side with multiple isolated cells 3044 therein for storing items. The isolated cells 3044 may be of varying sizes for storing different items. For example, and without limitation, the door 3040 may have a cell that is sized for a mobile phone, another sized for a tablet computer, another for medication bottles, etc. The cells may be thermally isolated from each other when the door 3040 is closed against the lid 3020. In some implementations, and without limitation, the coating or gasket on the perimeter rim 3041 may extend over the entire uppermost surface of the door 3040, including the top surface of the walls 3045 dividing the door 3040 into individual cells. The coating or gasket may aid to thermally isolate the cells from one another. In some implementations, and without limitation, the underside of the lid 3020 may have a mating surface (e.g., a recess) that is complementary to the pattern of walls 3045 in the door 3040, such that the walls 3045 form a tight (e.g., airtight) seal when the door 3040 is closed against the lid 3020. In further implementations, and without limitation, a coating or gasket may be present in the mating surface of the underside of the lid 3020 and the uppermost surface of the door 3040 may seal against it. Additionally, the walls 3045 may be insulative. For example, and without limitation, the walls 3045 may be made of a two-layer molded plastic having a cavity therein to act as a barrier to the transfer of thermal energy. In some implementations, and without limitation, the cavities within the walls 3045 may be filled with an insulative material (e.g., an insulative foam or rubber). In other implementations, the cavities within the walls 3045 may contain a partial vacuum to improve its thermal insulation. In further implementations, and without limitation, one or more surfaces of the door 3040 (e.g., the upper surfaces and/or the bottom surface of the door) may be coated with thermally reflective material, or the door 3040 may be made from other materials, such as reflective metals (e.g., aluminum, stainless steel, etc.), solid insulative polymer materials, fiberglass, composite materials, etc.

The isolation compartment door 3040 may also include multiple fastening devices (e.g., cinching straps, elastic bands, nets, pockets, etc.) for holding items such as mobile electronic devices (e.g., phones, tablets, etc.), medication containers, chapsticks, watches, eyeglasses, flashlights, etc. in a static position so that they do not shift when the lid of the container is lifted or the container is moved. Fastening devices may also be included on the underside of the lid 3020 (e.g., recessed slots 3024 shaped for various items such as chapstick, flashlights, etc.).

Additionally, the isolation compartment door 3040 may include multiple thermal vents 3050 that traverse the entire thickness of the floor of the door 3040. As shown in FIG. 8, the vents may be closed and opened by sliding doors 3051, which can be controlled and positioned by handles 3052. The user can open, partially open, or close the sliding doors 3051 by using sliding the handles 3052 along corresponding slots 3054. Closing the sliding doors may prevent the fluid, moisture, or air from moving between the large compartment 3030 and the isolation compartment, preventing items stored in the isolation compartment from getting wet and substantially preventing the transfer of thermal energy between the large compartment and the isolation compartment. Opening or partially opening the sliding doors allows the exchange of thermal energy between the compartments and may result in a greater temperature drop in the isolation compartment.

In the exemplary embodiment of FIGS. 7-8, each of the individual cells 3044 may have their own individual vent 3050, sliding door 3051, and sliding handle 3052. The thermal isolation of the cells 3044 from each other, and the individual thermal vents 3050 allow the user to establish multiple different temperature conditions within the isolation compartment when the door 3040 is closed and sealed against the underside of the lid 3020. For example, and without limitation, one may have a the thermal vent closed for a cell that is holding keys and a mobile phone, but also have an open thermal vent in a cell that is holding medication containers. The thermally isolated cells with individual thermal vents allows for highly customizable thermal zones within the isolation compartment for different stored items.

In other implementations, and without limitation, the thermal vents 3050 may further include thermal and/or moisture barriers thereover. Without limiting the invention, FIG. 8 shows the container 3000 including barriers 3053 positioned over the thermal vents 3050. The barriers 3053 may be a thin fabric, membrane, or film that acts as a moisture barrier and/or a thermal damper to slow the exchange of thermal energy between the large compartment 3030 and the isolation compartment. The barriers may be hydrophobic, such as a fabric made from hydrophobic fibers or a fabric having a hydrophobic coating. The barrier membrane may also function to dampen the movement of thermal energy from the isolation compartment to maintain a higher temperature in the isolation compartment for an extended period of time. For example, and without limitation, the barrier may be coated with an insulative composition such as a thermally reflective ceramic, metal, or composite material (as discussed above). In other examples, and without limitation, the barriers 3053 may include an insulative rubber, gel, or foam (e.g., a fabric with a thin insulative foam or rubber layer incorporated therein).

The exemplary embodiments shown in the FIGS. and described herein are for illustration purposes, and it is to be understood that the scope of the invention is not limited to examples described in relation to the drawings. As a further example, and without limitation, the isolation compartment door may be configured such that its outer perimeter rests on the wall of the body of the thermally insulative container and may cover the opening of the storage compartment therein. In such embodiments, and without limitation, the lid may be opened over the isolation compartment door without moving the isolation compartment door. For example, there may be two securing mechanisms accessible to the user on the front of the thermally insulative container, including (1) a first securing mechanism (e.g., a latch) to open the lid from the body of the container and the isolation compartment door such that the lid may be opened without lifting the isolation compartment door and allowing access to the items stored in the isolation compartment, and (2) a second securing mechanism (e.g., a latch) to open the isolation compartment from the body while maintaining a sealed connection between the isolation compartment door and the lid such that the storage compartment in the body of the container is accessible and the isolation compartment remains closed and sealed. In some implementations, and without limitation, the container may also include a locking mechanism which may be located near or mechanically integrated into the first securing mechanism. The locking mechanism may be a keyed lock, a combination lock, or other locking mechanism that prevents an unauthorized person from accessing the isolation compartment. The locking mechanism may prevent the theft or tampering of valuable, delicate, or personal items that are stored in the isolation compartment.

Figure 9:
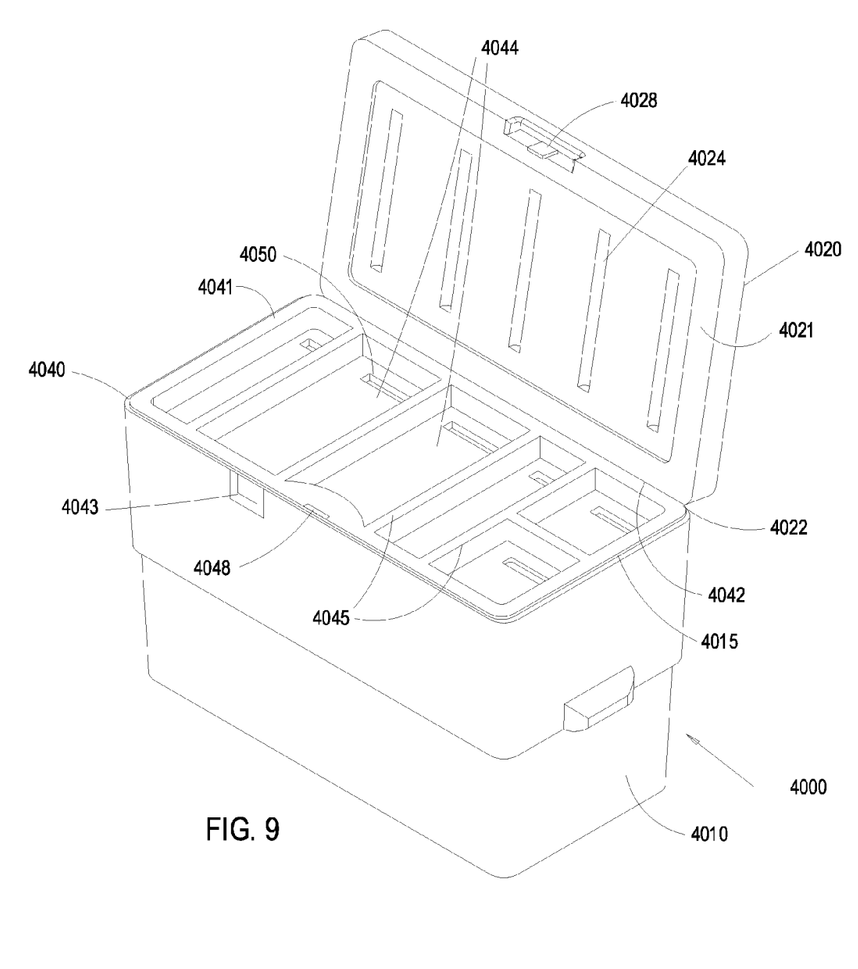
FIG. 9 is a perspective view of a thermally insulative container according to an embodiment of the present invention, in which the lid of the container is open and the door of the isolation compartment is open and at a 90° relative to the lid and resting over and covering the storage compartment of the body of container.

Without limiting the invention FIG. 9 provides an exemplary embodiment of thermally insulative container 4000, which includes an isolation compartment door 4040 having an outer perimeter 4041 that rests on the perimeter wall 4015 of the container body 4010. The body 4010 contains a large storage compartment 4030 which may be used to store a coolant and objects and materials that are to be kept cool (it is obscured in FIG. 9 by the isolation compartment door 4040). The lid 4020 may be hingedly attached to the body 4010 at hinged attachment 4022, such that it is able swing open at least 80° (e.g., in the range of about 80° to about 120°, or any value or range of values therein). The lid 4020 may have a sealing surface 4021 that sits against the perimeter rim 4041 of the door 4040, creating a tight sealed connection between the lid 4020 and the door 4040 (e.g., an air-tight seal for minimizing the transfer of thermal energy between the exterior and interior of the isolation compartment).

The isolation compartment door 4040 may be hingedly attached to the body 4010 at hinged attachment 4042, although it is to be understood that the position and attachment of the isolation compartment door may vary in other embodiments. The isolation compartment door 4040 may have an insulative structure. The isolation compartment door 4040 may have a perimeter rim 4041 that interfaces with a sealing surface 4021 on the bottom side of the lid 4020. The perimeter rim 4041 may have a coating or gasket thereon for creating a tight, insulative seal when the lid 4020 is closed against the door 4040. In other implementations, and without limitation, the sealing surface 4021 of the lid 4020 may include a coating or gasket thereon, and the perimeter rim 4041 may close against the coating or gasket.

When the isolation compartment door 4040 is closed against the underside of the lid 4020, a thermally sealed isolation compartment may be established between the door 4040 and the underside of the lid 4020. The isolation compartment door 4040 may include a securing member 4048 (e.g., a latch) that engages with the latch member 4028 of the lid 4020 and holds the door 4040 closed and sealed against the underside of the lid 4020 when the lid 4020 is moved into the closed position. The isolation compartment door 4040 may include an additional securing mechanism 4043 for securing the door 4040 to the body 4010. The user may disengage the securing mechanism 4043 from the body 4010 to lift both the lid 4020 and the door 4040 together without opening the isolation compartment.

The isolation compartment door 4040 may have an upper tray-like side with multiple isolated cells 4044 therein for storing items. The isolated cells 4044 may be of varying sizes for storing different items. The cells may be thermally isolated from each other when the door 4040 is closed against the lid 4020. In some implementations, and without limitation, the coating or gasket on the perimeter rim 4041 may extend over the entire uppermost surface of the door 4040, including the top surface of the walls 4045 dividing the door 4040 into individual cells. The coating or gasket may aid to thermally isolate the cells from one another. In some implementations, and without limitation, the underside of the lid 4020 may have a mating surface (e.g., a recess) that is complementary to the pattern of walls 4045 in the door 4040, such that the walls 4045 form a tight (e.g., airtight) seal when the door 4040 is closed against the lid 4020. In further implementations, and without limitation, a coating or gasket may be present in the mating surface of the underside of the lid 4020 and the uppermost surface of the door 4040 may seal against it. Additionally, the walls 4045 may be insulative.

The isolation compartment door 4040 may also include multiple fastening devices (e.g., cinching straps, elastic bands, nets, pockets, etc.) for holding items such as mobile electronic devices (e.g., phones, tablets, etc.), medication containers, chapsticks, watches, eyeglasses, flashlights, etc. in a static position so that they do not shift when the lid of the container is lifted or the container is moved. Fastening devices may also be included on the underside of the lid 4020 (e.g., recessed slots 4024 shaped for various items such as chapstick, flashlights, etc.).

Additionally, the isolation compartment door 4040 may include multiple thermal vents 4050 that traverse the entire thickness of the floor of the door 4040. The vents may be closed and opened by sliding doors, which can be controlled and positioned by handles, as previously described herein. The user can open, partially open, or close the thermal vents by sliding the sliding doors using the handles. Closing the sliding doors may prevent the fluid, moisture, or air from moving between the large compartment 4030 and the isolation compartment, preventing items stored in the isolation compartment from getting wet and substantially preventing the transfer of thermal energy between the large compartment and the isolation compartment. Opening or partially opening the sliding doors allows the exchange of thermal energy between the compartments and may result in a greater temperature drop in the isolation compartment. In further implementations, and without limitation, the thermal vents 4050 may further include barriers positioned over the thermal vents 4050, as described in more detail above in reference to other figures and embodiments.

Figure 10:
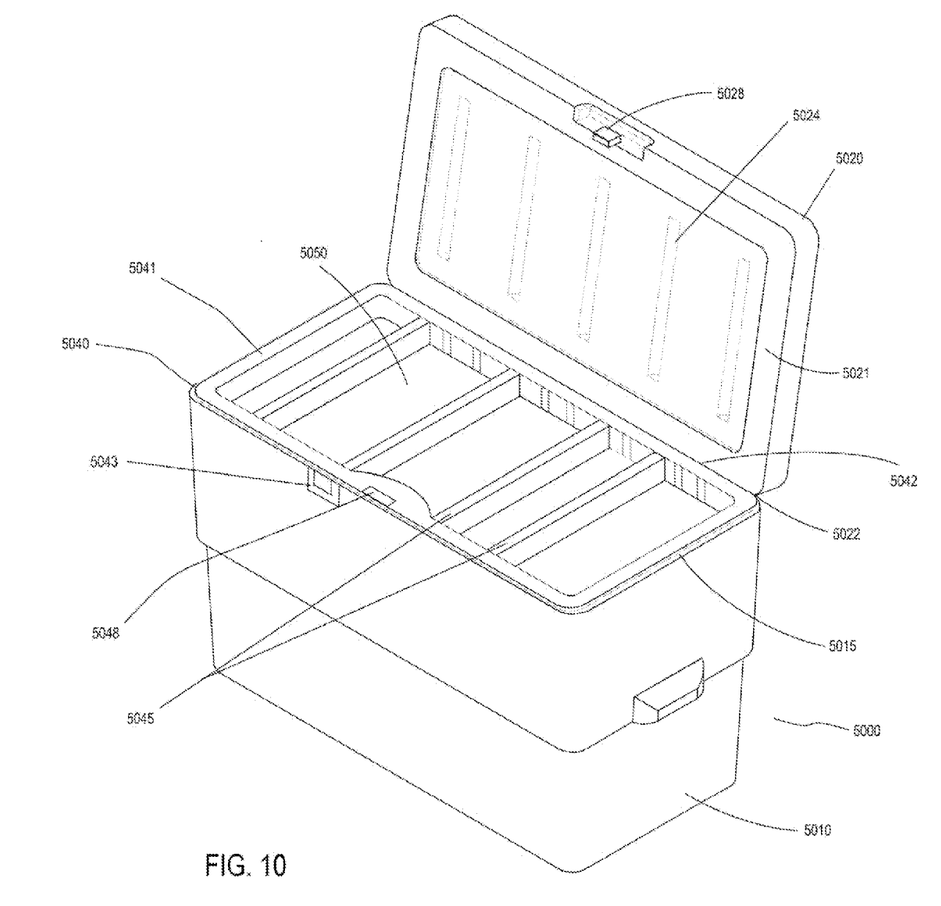
FIG. 10 is a perspective view of a thermally insulative container according to an embodiment of the present invention, in which the lid of the container is open and the door of the isolation compartment is open and at a 90° relative to the lid and resting over and covering the storage compartment of the body of container.

Without limiting the invention, FIG. 10 provides a further exemplary embodiment of a thermally insulative container having an isolation compartment door that may cover the opening of the storage compartment therein. Thermally insulative container 5000 may include an isolation compartment door 5040 having an outer perimeter 5041 that rests on the perimeter wall 5015 of the container body 5010. The body 5010 contains a large storage compartment 5030 which may be used to store a coolant and objects and materials that are to be kept cool (it is obstructed in FIG. 10 by the isolation compartment door 5040). The lid 5020 may be hingedly attached to the body 5010 at hinged attachment 5022, such that it is able swing open at least 80° (e.g., in the range of about 80° to about 120°, or any value or range of values therein). The lid 5020 may have a sealing surface 5021 that sits against the perimeter rim 5041 of the door 5040, creating a tight sealed connection between the lid 5020 and the door 5040 (e.g., an air-tight seal for minimizing the transfer of thermal energy between the exterior and interior of the isolation compartment).

The isolation compartment door 5040 may be hingedly attached to the body 5010 at hinged attachment 5042, although it is to be understood that the position and attachment of the isolation compartment door may vary in other embodiments. The isolation compartment door 5040 may have an insulative structure. The isolation compartment door 5040 may have a perimeter rim 5041 that interfaces with a sealing surface 5021 on the bottom side of the lid 5020. The perimeter rim 5041 may have a coating or gasket thereon for creating a tight, insulative seal when the lid 5020 is closed against the door 5040. In other implementations, and without limitation, the sealing surface 5021 of the lid 5020 may include a coating or gasket thereon, and the perimeter rim 5041 may close against the coating or gasket.

When the isolation compartment door 5040 is closed against the underside of the lid 5020, a thermally sealed isolation compartment may be established between the door 5040 and the underside of the lid 5020. The isolation compartment door 5040 may include a securing member 5048 (e.g., a latch) that engages with the latch member 5028 of the lid 5020 and holds the door 5040 closed and sealed against the underside of the lid 5020 when the lid 5020 is moved into the closed position. The isolation compartment door 5040 may include an additional securing mechanism 5043 for securing the door 5040 to the body 5010. The user may disengage the securing mechanism 5043 from the body 5010 to lift both the lid 5020 and the door 5040 together without opening the isolation compartment. Additionally, the user may disengage the securing mechanism 5043 to release the isolation compartment door from the body 5010 of the container when the lid 5020 is already open, to allow access to the storage compartment in the body 5010.

The isolation compartment door 5040 may have an upper tray-like side with multiple slots 5046 therein for engaging and positioning one or more movable dividers 5045 to create spaces of adjustable size for storing items. The dividers 5045 may be repositionable to allow the storage area of recess 5050 to be customized to the particular items that the user wishes to store. The dividers 5045 may be positioned within the various slots 5046 available in the recess 5050. For example, and without limitation, a relatively narrow slot may be created to store small items such as playing cards, mobile phones, etc.

The isolation compartment door 5040 may also include multiple fastening devices (e.g., cinching straps, elastic bands, nets, pockets, etc.) for holding items such as mobile electronic devices (e.g., phones, tablets, etc.), medication containers, chapsticks, watches, eyeglasses, flashlights, etc. in a static position so that they do not shift when the lid of the container is lifted or the container is moved. Fastening devices may also be included on the underside of the lid 5020 (e.g., recessed slots 5024 which may be shaped for various items such as chapstick, flashlights, etc.).

Additionally, the isolation compartment door 5040 may include multiple thermal vents that traverse the entire thickness of the door 5040 (as shown in other figures). The vents may be closed and opened by sliding doors, which can be controlled and positioned by handles, as previously described herein. The user can open, partially open, or close the thermal vents by sliding the sliding doors using the handles. Closing the sliding doors may prevent the fluid, moisture, or air from moving between the large compartment 5030 and the isolation compartment, preventing items stored in the isolation compartment from getting wet and substantially preventing the transfer of thermal energy between the large compartment and the isolation compartment. Opening or partially opening the sliding doors allows the exchange of thermal energy between the compartments and may result in a greater temperature drop in the isolation compartment. In further implementations, and without limitation, the thermal vents may further include barriers positioned over the thermal vents (as shown in other drawings), as described in more detail above in reference to other figures and embodiments.

The present invention provides a thermally insulative container that includes a storage compartment that can store a coolant as well as items that the user wants to keep cool, as well as an isolation compartment in which the user may keep items that he wishes to keep dry and/or at a higher temperature. It is to be understood that here are several variations in the thermally insulative container that provide additional benefits, as disclosed above. It should also be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:
1. A thermally insulated container, comprising:
 a. a body having thermally insulative walls and a first compartment therein for storing food and beverages;
 b. a lid attached to said body, said lid having a perimeter shape that is complementary to an opening in said body and said lid seals said compartment when said lid is closed over said compartment;
 c. a second compartment within said lid accessible from an underside of said lid, said second compartment including a door for accessing said second compartment attached to said lid, wherein said door has a surface at or near its edge that seals against a corresponding complementary surface in said underside of said lid to close said compartment; and d. at least one adjustable thermal vent in a surface of said second compartment for allowing the passage of heat between said first and second compartments.

2. The container of claim 1, wherein said second compartment further comprises a closing mechanism for closing said adjustable thermal vent.

3. The container of claim 1, wherein said at least one adjustable thermal vent comprises a barrier thereover preventing the passage of liquid between said first compartment and said second compartment.

4. The container of claim 1, wherein an interior wall of said second compartment comprises recesses therein for holding stored items.

5. The container of claim 4, wherein said recesses comprise fastening devices for holding stored items in a static position.

6. The container of claim 4, wherein said door comprises multiple divided compartments therein that are thermally insulated from one another when the door is closed against said lid.

7. The container of claim 4, wherein two or more of said divided compartments individually comprise at least one adjustable thermal vent.

8. A thermally insulated container, comprising:
   a. a body having thermally insulative walls and a first compartment therein, the body having an opening therein for access to the interior of the first compartment;
   b. a tray having a perimeter shape that is substantially the same as said opening in said body, said tray being attached to said body and moveable with respect to said opening;
   c. a thermally insulated lid having a perimeter shape that is substantially the same as said opening in said body, wherein said lid closes over said tray and said opening in said body, and thermally seals said insulated container thereby closing the first compartment between said tray and said body and creating a second compartment between said lid and said tray; and
   d. at least one adjustable thermal vent in a surface of said tray for allowing the passage of heat between said first and second compartments.

9. The container of claim 8, wherein said tray comprises a plurality of compartments therein for separating stored items.

10. The container of claim 9, wherein at least one of said plurality of compartments is individually thermally insulated from the other compartments when said lid is closed over said tray.

11. The container of claim 8, further comprising at least one moveable divider that can be repositioned within said tray, wherein said tray comprises a plurality of positioning structures for engaging with said at least one divider and holding it in place.

12. The container of claim 8, wherein said tray further comprises a closing mechanism for closing said adjustable thermal vent.

13. The container of claim 8, wherein said tray comprises fastening devices thereon for holding stored items in a static position.

14. The container of claim 8, further comprising an insulative gasket along an interfacing surface of said lid that is between said lid and said tray and creates a thermal seal between said lid and said tray when said lid is closed over said tray.

15. The container of claim 8, further comprising a membrane over said at least one adjustable thermal vent preventing the passage of liquid between said first compartment and said second compartment.

16. An insulative container capable of storing food and other items at different temperatures, comprising:
   a. a body having thermally insulative walls and a storage compartment therein, the body having an opening therein for access to the interior of the storage compartment;
   b. a lid that closes over said opening and having a perimeter shape that is complementary to the shape of said opening;
   c. a tray having thermally insulative walls that sits over said storage compartment and has at least one recess therein for storing items, said tray having a sealing edge that closes against a bottom side of said lid, wherein said lid has an interfacing surface against which said sealing edge of said tray can be closed, thereby thermally sealing said at least one recess against said lid;
   d. at least one adjustable thermal vent in a surface of said tray between said storage compartment and said tray for allowing the passage of heat between said storage compartment and said recess; and
   e. a closing mechanism for partially or fully closing said adjustable thermal vent.

17. The container of claim 16, further comprising fastening devices on said tray and in said bottom side of said lid for holding stored items in a static position within the thermally sealed space between the tray and the bottom side of the lid.

18. The container of claim 16, further comprising at least one moveable divider that can be repositioned within said at least one recess, wherein said tray comprises a plurality of positioning structures within said at least one recess for engaging with said at least one divider and holding it in place.

19. The container of claim 16, wherein said tray comprises a plurality of recesses therein for separating stored items.

20. The container of claim 19, wherein at least one of said plurality of recesses is individually thermally insulated from the other recesses when said tray is closed a bottom side of said lid.

* * * * *